United States Patent
Park et al.

(10) Patent No.: US 9,273,645 B2
(45) Date of Patent: Mar. 1, 2016

(54) FLUID HEATING DEVICE AND VEHICLE FUEL SYSTEM USING THE SAME

(71) Applicant: Hyundai Motor Company, Seoul (KR)

(72) Inventors: Chang-Jun Park, Changwon-si (KR); Myeong Hwan Kim, Hwaseong-si (KR); Chang-Han Kim, Gwangju-si (KR)

(73) Assignee: Hyundai Motor Company, Seoul (KR)

( * ) Notice: Subject to any disclaimer, the term of this patent is extended or adjusted under 35 U.S.C. 154(b) by 85 days.

(21) Appl. No.: 14/098,331

(22) Filed: Dec. 5, 2013

(65) Prior Publication Data

US 2014/0165973 A1    Jun. 19, 2014

(30) Foreign Application Priority Data

Dec. 17, 2012    (KR) .......................... 10-2012-0147807

(51) Int. Cl.
*F02M 37/04*    (2006.01)
*F02M 31/125*    (2006.01)

(52) U.S. Cl.
CPC .............. *F02M 31/125* (2013.01); *Y02T 10/126* (2013.01)

(58) Field of Classification Search
CPC ... F02M 31/12; F02M 31/125; F02M 31/135; Y02T 10/126

USPC .......................................................... 123/549
See application file for complete search history.

(56) References Cited

U.S. PATENT DOCUMENTS

| | | | | | |
|---|---|---|---|---|---|
| 4,756,294 | A | * | 7/1988 | Nakayama et al. | 123/549 |
| 4,881,508 | A | * | 11/1989 | Van Den Elst et al. | 123/549 |
| 5,850,822 | A | * | 12/1998 | Romann et al. | 123/549 |
| 2009/0260600 | A1 | * | 10/2009 | Kim | 123/509 |

FOREIGN PATENT DOCUMENTS

| | | |
|---|---|---|
| KR | 1999-019420 A | 3/1999 |
| KR | 10-0735019 B1 | 7/2007 |

\* cited by examiner

*Primary Examiner* — Marguerite McMahon
(74) *Attorney, Agent, or Firm* — Morgan, Lewis & Bockius LLP

(57) ABSTRACT

A fluid heating device of a vehicle fuel system includes: a case having a fluid inlet for letting in fluid, a fluid outlet for letting out the fluid, and an inner space that communicates with the fluid inlet and the fluid outlet; upper and lower power-supply and heat-radiation plates that are arranged in the inner space to be vertically spaced apart from each other, and supply external power; and one or more PTC elements that are interposed between the upper and lower power-supply and heat-radiation plates to receive the external power, and spaced apart from each other to form one or more fluid flow holes. Accordingly, the combustion of the fuel and the cold start performance of the vehicle can be improved.

15 Claims, 4 Drawing Sheets

FLUID HEATING DEVICE AND VEHICLE FUEL SYSTEM USING THE SAME

CROSS-REFERENCE TO RELATED APPLICATION

The present application claims priority of Korean Patent Application Number 10-2012-0147807 filed Dec. 17, 2012, the entire contents of which application is incorporated herein for all purposes by this reference.

BACKGROUND OF INVENTION

1. Field of Invention

The present invention relates to a fluid heating device using a PTC element and a vehicle fuel system using the same.

2. Description of Related Art

In general, a fluid heating device is a device that heats a moving fluid by an appropriate heat source, which is used in various fields.

In a vehicle, the fluid heating device is used as a fuel heater. The fuel heater preheats fuel to an adequate temperature before supplying the fuel to an internal combustion engine to improve combustion of fuel, cold start performance of the engine, etc.

The fuel heater for the vehicle is installed on a fuel line to preheat diesel fuel, for example.

In the case of flex-fuel vehicles that are fueled by bioethanol (E100), gasoline fuel is used instead of the fuel heater, as well as it is used as start-up fuel, in order to enhance cold start performance of the engine.

That is, startup may be in trouble at an outside temperature below 15° C. because the ignition temperature of bioethanol is 12° C., which is high. To overcome this, attempts are being made to enhance cold start performance by spraying gasoline fuel to the back of the throttle body during engine start-up.

However, a conventional flex-fuel vehicle, which uses gasoline fuel as auxiliary fuel to enhance cold start performance, requires an auxiliary fuel tank for storing gasoline fuel and an auxiliary fuel system including a fuel cap, a fuel pump, etc. Thus, the conventional flex-fuel vehicle is not desirable in terms of vehicle weight, cost, assembly productivity, collision resistance performance, and so on.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a fluid heating device, which effectively heats fluid within a short time, is applied to a vehicle fuel system to improve engine cold start performance, and reduces vehicle weight and cost with its small size and lightweight design, and a vehicle fuel system using the same.

Various aspects of the present invention provide for a fluid heating device including: a case having a fluid inlet for letting in fluid, a fluid outlet for letting out the fluid, and an inner space that communicates with the fluid inlet and the fluid outlet; upper and lower power-supply and heat-radiation plates that are arranged in the inner space to be vertically spaced apart from each other, and supply external power; and one or more PTC elements that are interposed between the upper and lower power-supply and heat-radiation plates to receive the external power, and spaced apart from each other to form one or more fluid flow holes.

The case may include: an upper case including the fluid inlet, the fluid outlet, and the inner space; and a lower case coupled to the upper case to seal the upper case.

The upper case may include a case body having the inner space, the fluid inlet may be integrally and protrusively formed at one side of the case body to communicate with the inner space, the fluid outlet may be integrally and protrusively formed at the other side of the case body facing the fluid inlet, and a connector for supplying the external power may be integrally and protrusively formed at the case body in a direction perpendicular to the fluid inlet and the fluid outlet.

The upper and lower power-supply and heat-radiation plates may be formed in the shape of a rectangular plate.

The upper and lower power-supply and heat-radiation plates each may include a terminal for connecting the external power supply.

The fluid heating device may further include a support bracket to be fitted to support the upper and lower power-supply and heat-radiation plates.

First and second assembly grooves may be formed to be depressed on the bottom and top surfaces of the inner space of the case body, and the support bracket may be fitted into the first and second assembly grooves.

The one or more PTC elements may extend along the length of the upper and lower power-supply and heat-radiation plates, and may be spaced apart from each other at predetermined intervals along the width thereof.

Heat-radiation fins may be provided in an upper space between the upper power-supply and heat-radiation plate and the case and between the lower power-supply and heat-radiation plate and the case, respectively.

The heat-radiation fins may be formed to be raised and depressed along the width of the upper and lower power-supply and heat-radiation plates.

In the upper and lower spaces, one or more fluid flow holes may be formed in the area excluding the heat-radiation fins.

Various aspects of the present invention provide for a vehicle fluid system including: a fuel tank for containing a predetermined volume of fuel; a fuel line that connects the fuel tank and an engine to supply the fuel from the fuel tank to the engine; and a fluid heating device installed on the fuel line.

The fuel may be diesel fuel or bioethanol.

According to the fluid heating device and the vehicle fuel system according to the exemplary aspects of the present invention, the fluid flowing through the fluid flow holes formed between the PTC elements interposed between the upper and lower heat-radiation plates can be quickly heated by receiving heat directly from the PTC elements.

Moreover, as fluid flows through the fluid flow holes between the heat-radiation fins interposed between the upper heat-radiation plate and the case and the fluid flow holes between the lower heat-radiation plate and the case, the fluid can be effectively heated by the heat-radiation plates and the heat-radiation fins, by using the heat generated from the PTC elements.

In the case of a fuel system for a flex-fuel vehicle fueled by bioethanol, fuel is properly preheated before the fuel is introduced into the engine, thereby improving the cold start performance of the flex-fuel vehicle.

The fluid heating device can be manufactured in a small size and lightweight design because of its simple structure. Accordingly, vehicle weight and cost can be reduced, and assembly productivity also can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
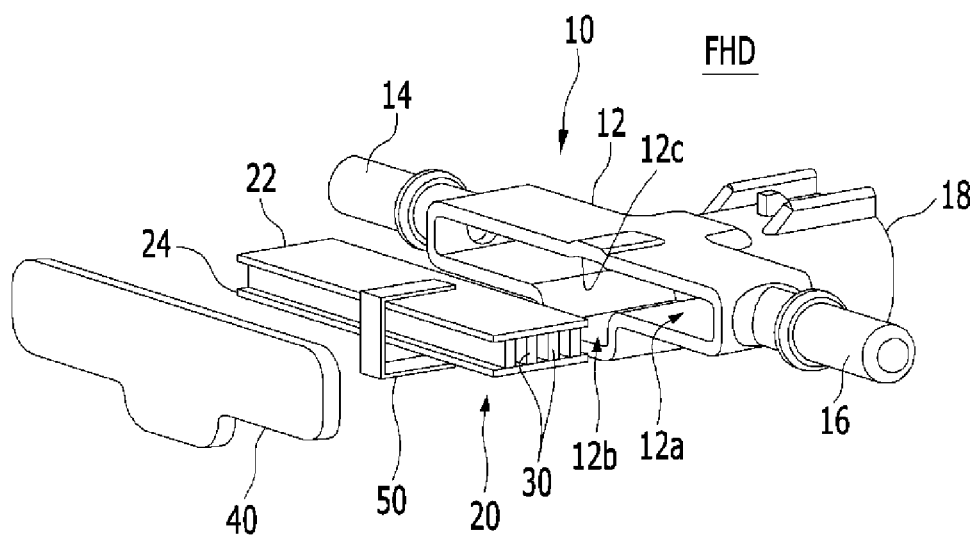
FIG. 1 is an exploded perspective view of an exemplary fluid heating device according to the present invention.
Figure 2:
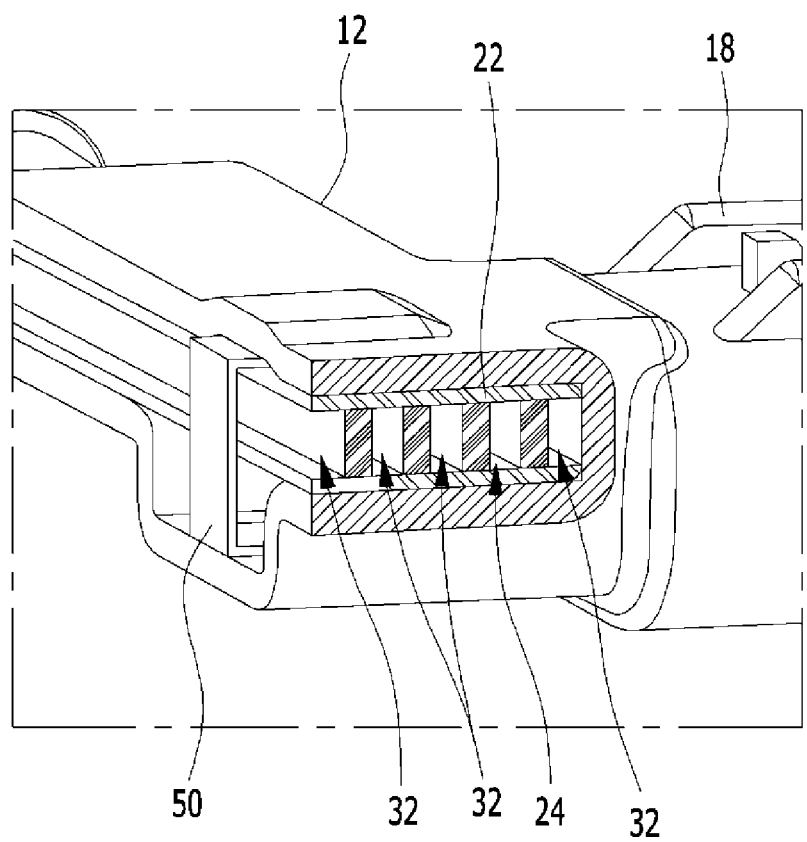
FIG. 2 is an assembly perspective view of the fluid heating device of FIG. 1.

Referring to FIG. 1 and FIG. 2, a fluid heating device (FHD) according to various embodiments of the present invention includes an upper case 10, a power-supply and heat-radiation plate 20, one or more positive temperature coefficient (PTC) elements 30, and a lower case 40.

The upper case 10 generally includes a case body 12 having an inner space 12a of a predetermined size.

The inner space 12a includes an opening communicating with the outside.

A fluid inlet 14 is integrally and protrusively formed at one side of the case body 12, and communicates with the inner space 12a to let fluid into the inner space 12a. One will appreciate that the fluid inlet and the case body may be monolithically formed.

A fluid outlet 16 is integrally and protrusively formed at the other side of the case body 12 facing the fluid inlet 14, and communicates with the inner space 12a to let fluid out of the upper case 10. One will appreciate that the fluid outlet and the case body may be monolithically formed.

Moreover, a connector 18 is integrally and protrusively formed at the case body 12 in a direction perpendicular to the fluid inlet 14 and the fluid outlet 16. One will appreciate that the connector and the case body may be monolithically formed.

The connector 18 serves as a power connector for supplying external power (e.g., electrical power) to the PTC elements 30.

The power-supply and heat-radiation plate 20 is inserted and mounted in the inner space 12a of the case body 12.

The power-supply and heat-radiation plate 20 generally includes an upper power-supply and heat-radiation plate 22 and a lower power-supply and heat-radiation plate 24, both of which are in the shape of a rectangular plate.

A terminal to which a power connector can be externally connected by means of the connector 18 may be fixedly attached to the upper power-supply and heat-radiation plate 22 and the lower power-supply and heat-radiation plate 24.

A first assembly groove 12b and a second assembly groove 12c are formed to be depressed on the bottom and top surfaces of the inner space 12a of the case body 12, both of which face each other.

A support bracket 50 is provided to support the one or more PTC elements 30 that are inserted and interposed between the upper power-supply and heat-radiation plate 22 and the lower power-supply and heat-radiation plate 24.

The support bracket 50 has an approximately U-shape, and one end of the support bracket 50 is attached to the top surface of the upper power-supply and heat-radiation plate 22, and the other end thereof is attached to the lower power-supply and heat-radiation plate 24.

One end and the other end of the support bracket 50 are respectively fitted into the first assembly groove 12b and the second assembly groove 12c, whereby the upper power-supply and heat-radiation plate 22 and the lower power-supply and heat-radiation plate 24, and the one or more PTC elements 30 interposed between the upper power-supply and heat-radiation plate 22 and the lower power-supply and heat-radiation plate 24 are supported by the support bracket 50 within the upper case 10.

The PTC elements 30 are well-known electric heat generating elements using a PTC thermistor which maintains constant temperature when power is externally applied thereto.

The PTC elements 30 are in the shape of an approximately rectangular plate, and are interposed between the upper power-supply and heat-radiation plate 22 and the lower power-supply and heat-radiation plate 24 to receive external power from the upper power-supply and heat-radiation plate 22 and the lower power-supply and heat-radiation plate 24.

The PTC elements 30 are formed in fours in various embodiments of the present invention, and arranged at predetermined intervals along the width from one edge to the opposite edge between the upper power-supply and heat-radiation plate 22 and the lower power-supply and heat-radiation plate 24.

Each of the PTC elements 30 is approximately the same length as the heat-radiation plates.

One or more fluid flow holes are formed between the PTC elements 30 to cause fluid to flow therethrough.

Fluid flow holes 32 are also formed between the PTC element positioned at the innermost side and a side surface of the inner space and between the PTC element positioned at the outermost side and the lower case, respectively.

After the upper power-supply and heat-radiation plate 22, the lower power-supply and heat-radiation plate 24, and the PTC elements 30 are inserted and assembled into the inner space 12a through the opening of the inner space 12a formed in the case body 12 of the upper case 10, the lower case 40 is coupled to the case body 12a of the upper case 12 to block and seal the opening of the inner space 12a.

While five fluid flow holes are formed according to various embodiments of the present invention because four PTC elements 30 are interposed between the upper power-supply and heat-radiation plate 22 and the lower power-supply and heat-radiation plate 24, the present invention is not limited thereto but at least two fluid flow holes may be formed depending on the number of PTC elements 30.

Fluid introduced into the inner space 12a of the case body 12 through the fluid inlet 14 moves along the fluid flow holes 32, and then is discharged out of the case through the fluid outlet 16.

During the flow of fluid described above, when external power is applied to the PTC elements 30 through the upper power-supply and heat-radiation plate 22 and the lower power-supply and heat-radiation plate 24 by means of the connector 18, the PTC elements 30 rise to a certain temperature and generate heat.

The heat generated from the PTC elements 30 directly heats the fluid flowing along the fluid flow holes 32 formed by the PTC elements 30, thereby effectively warming the fluid within a short time.

Figure 3:
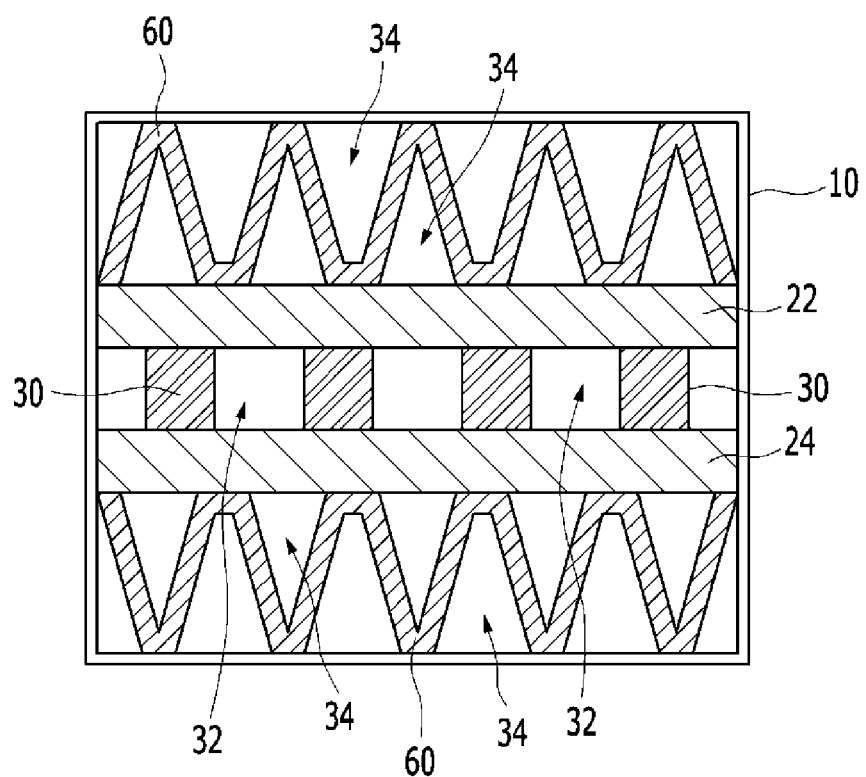
FIG. 3 is a cross-sectional view of an exemplary fluid heating device according to the present invention.

Referring to FIG. 3, heat-radiation fins 60 are provided in an upper space between the upper power-supply and heat-radiation plate 22 and the top of the upper case 10 and between the lower power-supply and heat-radiation plate 24 and the bottom of the upper case 10, respectively, and the other components are identical to those of the above described embodiments.

The heat-radiation fins 60 are the same width as the heat-radiation plates 22 and 24.

The heat-radiation fins 60 are formed to be raised and depressed in the height direction of the upper and lower power-supply and heat-radiation plates 22, 24.

In the upper and lower spaces, one or more fluid flow holes 34 through which fluid flows are formed in the area excluding the occupied by the heat-radiation fins 60.

The heat generated from the PTC elements 30 is transferred to the upper power-supply and heat-radiation plate 22 and the lower power-supply and heat-radiation plate 24, thereby heating the upper power-supply and heat-radiation plate 22 and the lower power-supply and heat-radiation plate 24.

The heat used to heat the upper power-supply and heat-radiation plate 22 and the lower power-supply and heat-radiation plate 24 is transferred to the heat-radiation fins 60, thus effectively heating the fluid flowing through the fluid flow holes 34 formed between the heat-radiation fins 60.

As more fluid flow holes can be formed in various embodiments than in some of the above-described embodiments, a larger amount of fluid can be effectively heated within a short time.

Figure 4:
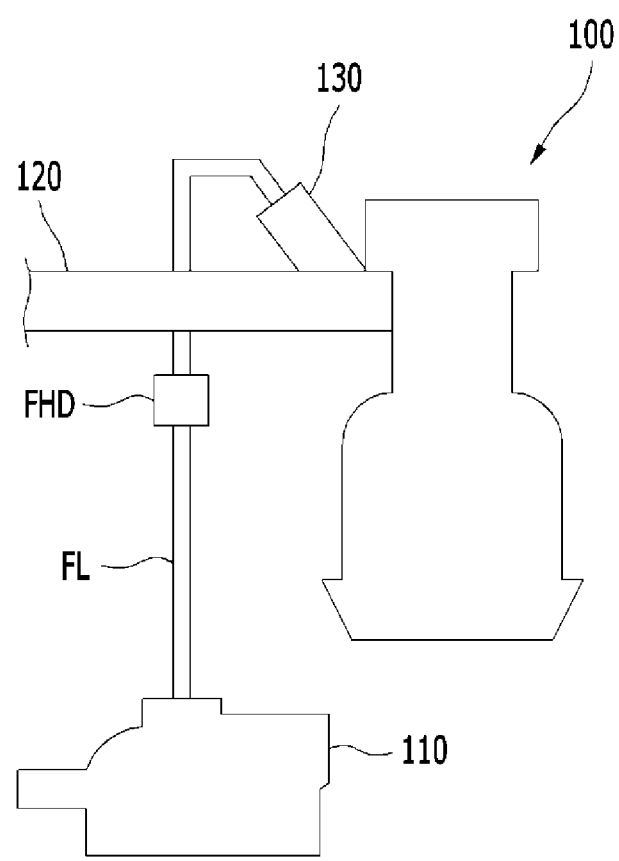
FIG. 4 is a schematic block diagram of an exemplary vehicle fuel system having a fluid heating device according to the present invention.

Referring to FIG. 4, a fluid heating device (FHD) according to various embodiments of the present invention is applied to a vehicle fuel system.

The vehicle fuel system may include a fuel tank for containing a predetermined volume of fuel and an injector 130 that receives the fuel from the fuel tank 100 and injects it to a combustion chamber of an engine 110 or to an intake manifold 120 connected to the combustion chamber.

The fluid heating device (FHD) according to various embodiments of the present invention is installed on a fuel line (FL) between the fuel tank 100 and the injector 130. Fuel is introduced into the fuel inlet of the fluid heating device (FHD), then properly preheated or heated while passing through the fuel heating device (FHD), and then supplied to the engine. Therefore, the cold start-up performance of the engine and the combustion of the fuel are improved.

The fluid heating device (FHD) according to various embodiments of the present invention may be installed on an appropriate part, e.g., the fuel tank, a fuel filter, or the like, other than the fuel line.

The fuel may be diesel fuel or bioethanol (E100), and the vehicle may be a diesel vehicle fueled by the diesel fuel, or a flex-fuel vehicle fueled by the bioethanol.

The fluid heating device according to various embodiments of the present invention is applicable to other types of vehicles that required to be preheated prior to fuel combustion.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fluid heating device comprising:
    a case having a fluid inlet for letting in fluid, a fluid outlet for letting out the fluid, and an inner space that fluidly communicates with the fluid inlet and the fluid outlet;
    upper and lower power-supply and heat-radiation plates that are arranged in the inner space and vertically spaced apart from each other, and supply external power; and
    one or more PTC elements that are interposed between the upper and lower power-supply and heat-radiation plates to receive the external power, and spaced apart from each other to form one or more fluid flow holes,
    wherein heat-radiation fins are provided in an upper space between the upper power-supply and heat-radiation plate and the case, and between the lower power-supply and heat-radiation plate and the case, respectively.

2. The fluid heating device of claim 1, wherein the case comprises:
    an upper case comprising the fluid inlet, the fluid outlet, and the inner space; and
    a lower case coupled to the upper case to enclose the inner space within the upper case.

3. The fluid heating device of claim 2, wherein the upper case comprises:
    a case body defining the inner space;
    wherein the fluid inlet is integrally and protrusively formed at a first side of the case body to communicate with the inner space;
    wherein the fluid outlet is integrally and protrusively formed at a second side of the case body facing the fluid inlet; and
    a connector for supplying the external power integrally and protrusively formed at the case body extending in a direction perpendicular to the fluid inlet and the fluid outlet.

4. The fluid heating device of claim 3, wherein the upper and lower power-supply and heat-radiation plates are rectangular plates.

5. The fluid heating device of claim 1, wherein the upper and lower power-supply and heat-radiation plates each comprise a terminal for connecting the external power supply.

6. The fluid heating device of claim 1, further comprising a support bracket fitted to support the upper and lower power-supply and heat-radiation plates.

7. The fluid heating device of claim 6, wherein
    first and second assembly grooves are formed as depressions on bottom and top surfaces of the inner space of the case body, and
    the support bracket is fitted into the first and second assembly grooves.

8. The fluid heating device of claim 1, wherein the one or more PTC elements extend along a length of the upper and lower power-supply and heat-radiation plates, and are spaced apart from each other at predetermined intervals along a width thereof.

9. The fluid heating device of claim 1, wherein the heat-radiation fins are formed to be raised and depressed along a width of the upper and lower power-supply and heat-radiation plates.

10. The fluid heating device of claim 1, wherein, in the upper and lower spaces, one or more fluid flow holes are formed in an area excluding the heat-radiation fins.

11. A vehicle fluid system comprising:
a fuel tank for containing a predetermined volume of fuel;
a fuel line that connects the fuel tank and an engine to supply the fuel from the fuel tank to the engine; and
the fluid heating device installed on the fuel line according to claim 1.

12. The vehicle fuel system of claim 11, wherein the fuel is diesel fuel or bioethanol.

13. A fluid heating device comprising:
a case having a fluid inlet for letting in fluid, a fluid outlet for letting out the fluid, and an inner space fluidly communicating with the fluid inlet and the fluid outlet;
upper and lower power-supply and heat-radiation plates arranged in the inner space and vertically spaced apart from each other supplying external power;
one or more PTC elements interposed between the upper and lower power-supply and heat-radiation plates to receive the external power, and spaced apart from each other to form one or more fluid flow holes; and
a support bracket fitted to support the upper and lower power-supply and heat-radiation plates, wherein
first and second assembly grooves are formed as depressions on bottom and top surfaces of the inner space of the case body, and
the support bracket is fitted into the first and second assembly grooves.

14. A vehicle fluid system comprising:
a fuel tank for containing a predetermined volume of fuel;
a fuel line that connects the fuel tank and an engine to supply the fuel from the fuel tank to the engine; and
the fluid heating device installed on the fuel line according to claim 13.

15. The vehicle fuel system of claim 14, wherein the fuel is diesel fuel or bioethanol.

\* \* \* \* \*